Patented June 22, 1954

2,681,938

UNITED STATES PATENT OFFICE 2,681,938

HYDROGENATION OF ACETYLENIC BOND UTILIZING A PALLADIUM-LEAD CATALYST

Herbert Lindlar, Basel, Switzerland, assignor to Hoffmann-La Roche Inc., Nutley, N. J., a corporation of New Jersey No Drawing. Application June 16, 1950, Serial No. 168,643

Claims priority, application Switzerland August 15, 1949

3 Claims. (Cl. 260—611)

This invention relates to hydrogenation catalysts; to processes for making the same; and to processes of hydrogenation employing said catalysts.

More particularly, the catalysts of the invention comprise palladium metal (either as such, or supported on suitable carriers, such as barium carbonate, barium sulfate, clay, calcium sulfate, calcium carbonate, magnesium oxide, charcoal or the like), modified by a treatment which includes the steps of contacting the palladium metal in an aqueous medium with lead salts or bismuth salts, or mixtures of lead salts and bismuth salts. One process of the invention includes the steps of: slurrying a suspension in water of finely divided palladium metal (unsupported, or supported on a carrier, as above indicated) with an aqueous solution or suspension of a salt of lead, or of bismuth, or of both of these metals; heating the resulting aqueous suspension for a short period; and separating the thus modified palladium catalyst.

The catalysts of the invention are advantageously used in processes of catalytically hydrogenating organic ene-yne compounds, that is, organic compounds possessing both acetylenic unsaturation and ethylenic unsaturation. As illustrations of such compounds may be mentioned vinylacetylene and polyene-yne compounds, e. g. 1,6-dihydroxy-3,7-dimethyl-9-[2',6',6'-trimethylcyclohexene - 1' - yl]-nonadiene-2,7-yne-4. By this process of the invention, only the acetylenic bond or bonds are hydrogenated, and these substantially only to the ethylenic stage; the ethylenic bond or bonds originally present in the compounds subjected to hydrogenation, or formed during the hydrogenation, remain substantially unaffected. The hydrogenation process of the invention is further characterized in that it can be effected in the liquid phase (e. g. in petroleum ether solution) and at substantially normal pressures and temperatures. In some cases, particularly when hydrogenating compounds which contain several double bonds in addition to the triple bond or bonds, it is desirable to add a small amount of quinoline to the reaction mixture.

The catalysts of the invention have the merit that they can easily be produced in uniform quality; when supported on a carrier, they are non-pyrophoric; and they selectively catalyze the hydrogenation of acetylenic bonds in the presence of ethylenic bonds.

The invention is further disclosed in the following examples, which are illustrative but not limitative thereof. It will be understood that the materials used in the following examples were as pure as practicable in order to avoid poisoning of the catalysts.

*Example 1*

50 g. of precipitated calcium carbonate were stirred in 400 cc. of water. 50 cc. of an aqueous palladous chloride solution containing 5 per cent of palladium were added. The mixture was stirred for 5 minutes at room temperature, then for 10 minutes at 80° C. The hot sludge was shaken in hydrogen until the absorption of hydrogen ceased. The precipitate was filtered by suction and washed thoroughly with water. The filter cake was stirred well with 500 cc. of water until the whole precipitate was in suspension. A solution of 5 g. of lead acetate in 100 cc. of water was then added and the mixture was stirred for 10 minutes at room temperature and then for 40 minutes in a boiling water bath. The catalyst formed was filtered off by suction, washed well with water, and dried in vacuo at 40°–50° C.

*Example 2*

50 cc. of an aqueous palladous chloride solution containing 5 per cent of palladium were diluted with 50 cc. of water, and the resulting solution was heated to about 80° C. Soda solution was then added until no further precipitate formed. While the suspension was still warm, it was shaken with hydrogen until the hydrogen uptake had ceased. The palladium metal thus formed was separated by suction-filtration, washed, resuspended in 100 cc. of water, and to the aqueous suspension was added a solution of 5 g. of lead acetate in 10 cc. of water. The resulting suspension was stirred, first at room temperature and then for a half hour period in a boiling water bath. The resulting catalyst precipitate was filtered off, washed well, and dried.

*Example 3*

To 20 g. of precipitated calcium carbonate in 50 cc. of water was added 20 cc. of an aqueous solution of palladous chloride containing 5 per cent of palladium. The suspension was stirred for 5 minutes at room temperature and then for 10 minutes at 80° C. A solution of sodium formate (prepared by reacting 1 cc. of formic acid with 30 cc. of 5 per cent soda solution) was carefully poured into the hot sludge. The solids were filtered off and washed thoroughly. While still moist, the filter cake was suspended by stirring in 100 cc. of water, and 1 g. of bismuth nitrate and 1 g. of lead acetate were added to the aqueous suspension. The mixture was stirred for 5 minutes at room temperature, and for half an hour at 90° C. The catalyst formed was filtered off, washed well with water, and dried in vacuo at 40°–50° C.

*Example 4*

20 cc. of an aqueous solution of palladous chloride containing 5 per cent palladium were diluted with hot water to a total volume of 200 cc. Then a 5 per cent soda solution was added until all the palladium had been precipitated. To the resulting hot suspension, a solution of sodium formate (prepared by reacting 1 cc. of formic acid with 30 cc. of 5 per cent soda solution) was added dropwise. After completion of the reduction, the water was decanted from the palladium metal and the latter was washed repeatedly by decantation. Thereupon, the palladium was suspended in 20 cc. of water, 1 g. of bismuth nitrate was added to the suspension and the mixture was stirred well. Hydrochloric acid was added as required, to keep the bismuth salt in solution. After stirring for half an hour at 90° C. the catalyst was filtered off, washed well, dried, and sieved through a fine sieve.

*Example 5*

50 g. of 1,6-dihydroxy-3,7-dimethyl-9-[2',6',6'-trimethyl - cyclohexene -1 ' - yl]-nonadiene - 2,7-yne-4, of melting point 54°–56° C., were suspended in 100 cc. of petroleum ether. 5 g. of the catalyst obtained in accordance with Example 1 and 2 g. of quinoline were added to the mixture. The mixture was then shaken with hydrogen under normal temperature and pressure until a volume of hydrogen corresponding to approximately 105 per cent of the amount of hydrogen theoretically needed for the conversion of the triple bond to a double bond had been taken up. Toward the end of the hydrogenation, the hydrogen absorption ceased almost completely, and the product started to crystallize out of the reaction mixture even at room temperature. The mixture was therefore heated until all organic material had dissolved, the catalyst was filtered off, and the filtrate was allowed to crystallize at −12° C. for approximately 24 hours. The crystalline material was then filtered off, washed with a little cold petroleum ether, and dried at room temperature under reduced pressure. The main product obtained was 1,6-dihydroxy - 3,7 - dimethyl - 9 - [2',6',6' - trimethyl - cyclohexene - 1' - yl] nonatriene - 2,4,7, having a melting point of approximately 73°–74° C.

*Example 6*

50 g. of 1-methoxy-3,7-dimethyl-6-hydroxy-9 - [2',6',6' - trimethyl - cyclohexene - 1' - yl]-nonadiene-2,7-yne-4, having an index of refraction $n_D^{22}=1.5215$, were mixed with 100 cc. of petroleum ether and 2 g. of the catalyst obtained in accordance with Example 3. The mixture was shaken with hydrogen at normal temperature and pressure until approximately 105 per cent of the theoretical quantity of hydrogen had been absorbed. The catalyst was filtered off, and the petroleum ether was distilled from the filtrate under reduced pressure. The residue consisted mainly of 1-methoxy-3,7-dimethyl-6-hydroxy-9 - [2',6',6' - trimethyl - cyclohexene - 1' - yl]-nonatriene-2,4,7, of $n_D^{22}=1.5140$.

*Example 7*

50 g. of 1-methoxy-3,7-dimethyl-7-hydroxy-9-[2',6',6' - trimethyl - cyclohexene - 1' -yl]-nonadiene-2,8-yne-4, of $n_D^{22}=1.5206$, were dissolved in 100 cc. of methanol, and 2 g. of the catalyst obtained in accordance with Example 4 and 2 g. of quinoline were added. The mixture was hydrogenated at normal temperature and pressure until approximately 105 per cent of the calculated quantity of hydrogen had been absorbed. The catalyst was then filtered off, and the solvent removed from the filtrate under reduced pressure. The residue consisted mainly of 1-methoxy-3,7-dimethyl - 7 - hydroxy - 9 -[2', 6',6' - trimethyl - cyclohexene - 1' - yl] - nonatriene - 2,4,8, of $n_D^{22}=1.5128$.

I claim:

1. In the process of making a lead-palladium hydrogenation catalyst having enhanced selectivity to catalyze the hydrogenation of an acetylenic bond only to the olefinic stage, the improvement which comprises heating a slurry of reduced palladium metal catalyst with an aqueous solution of a lead salt until lead has been precipitated upon the palladium to enhance the selectivity of the catalyst, and separating the thus modified catalyst.

2. A lead-palladium hydrogenation catalyst produced by the process of claim 1.

3. A process which comprises subjecting an organic compound containing both acetylenic and olefinic unsaturation and selected from the group consisting of hydrocarbons and dihydric alcohols and lower alkyl ethers of the latter to the action of hydrogen in liquid phase and in the presence of the catalyst of claim 2 to convert acetylenic unsaturation to olefinic unsaturation.

References Cited in the file of this patent

UNITED STATES PATENTS

| Number | Name | Date |
|---|---|---|
| 1,777,600 | Bolton et al. | Oct. 7, 1930 |
| 1,860,624 | Sauerwein | May 31, 1932 |
| 1,925,820 | Reyerson | Sept. 5, 1933 |
| 2,145,387 | Berndt et al. | Jan. 31, 1939 |
| 2,156,936 | Calcott et al. | May 2, 1939 |
| 2,331,915 | Kirkpatrick | Oct. 19, 1943 |
| 2,384,501 | Streicher | Sept. 11, 1945 |
| 2,411,726 | Holroyd et al. | Nov. 26, 1946 |
| 2,456,633 | Haensel | Dec. 21, 1948 |
| 2,461,959 | Brandon | Feb. 15, 1949 |
| 2,478,916 | Haensel et al. | Aug. 16, 1949 |

FOREIGN PATENTS

| Number | Country | Date |
|---|---|---|
| 13,298/15 | Great Britain | Aug. 24, 1916 |
| | (3 pages) (No drawing) | |

OTHER REFERENCES

Yoshioka (Japan), 153,870, Nov. 26, 1942 (Abstracted in Chem. Abstracts, vol. 43 (1949) page 3833).

Kawamoto et al. (Japan), 174,274, Dec. 10, 1946. (Abstracted in Chem. Abstracts, vol. 44 (1950) page 1524).